Oct. 31, 1933.  B. STRAI  1,933,285
SWITCH
Filed Sept. 20, 1928  7 Sheets-Sheet 1
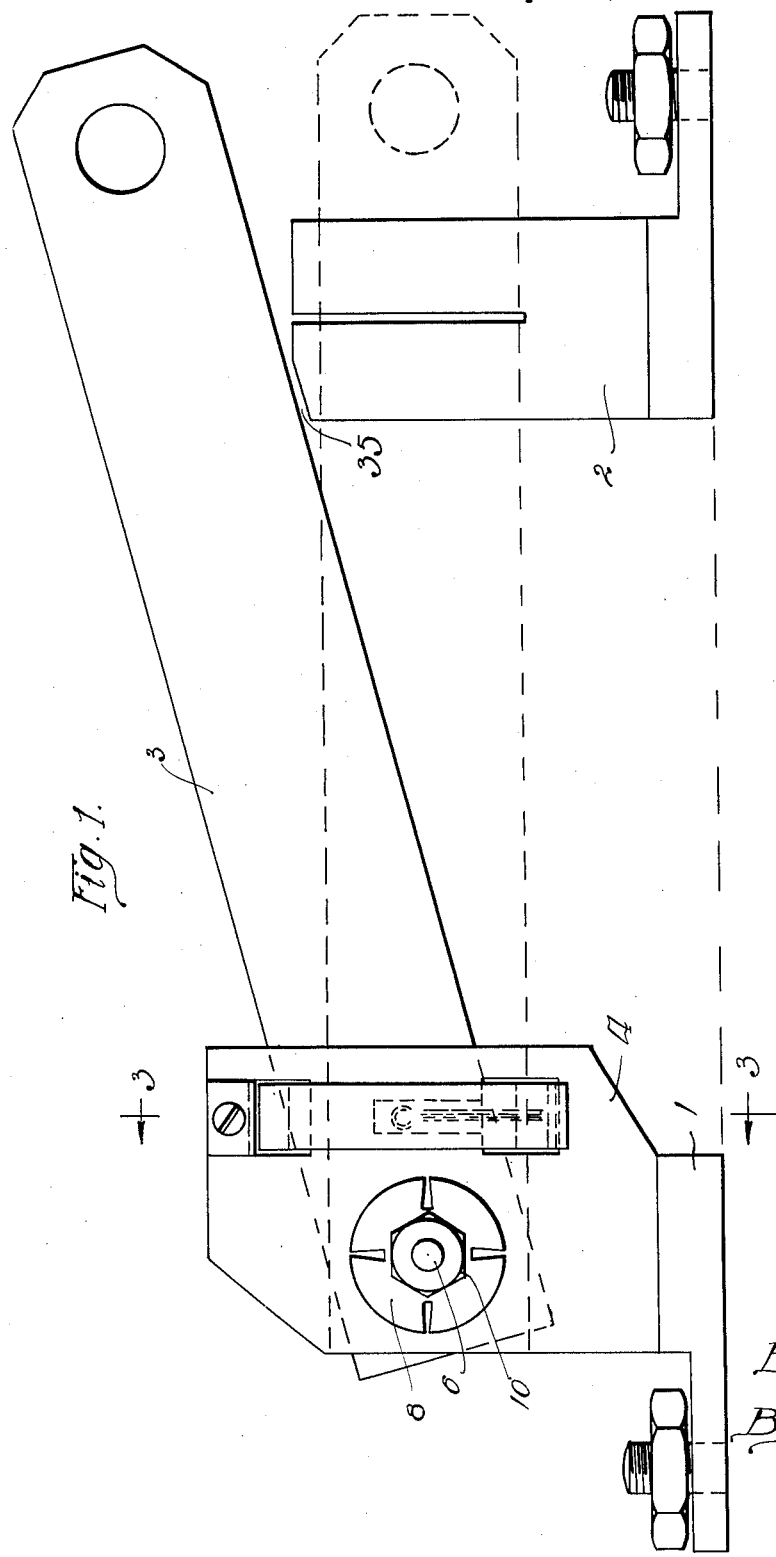
Inventor:
Bernhard Strai
By Brown Jackson,
Boettcher Dienner
Attys.

Oct. 31, 1933.  B. STRAI  1,933,285
SWITCH
Filed Sept. 20, 1928  7 Sheets-Sheet 2

Inventor
Bernhard Strai
By Brown Jackson Boettcher Dienner
Attys.

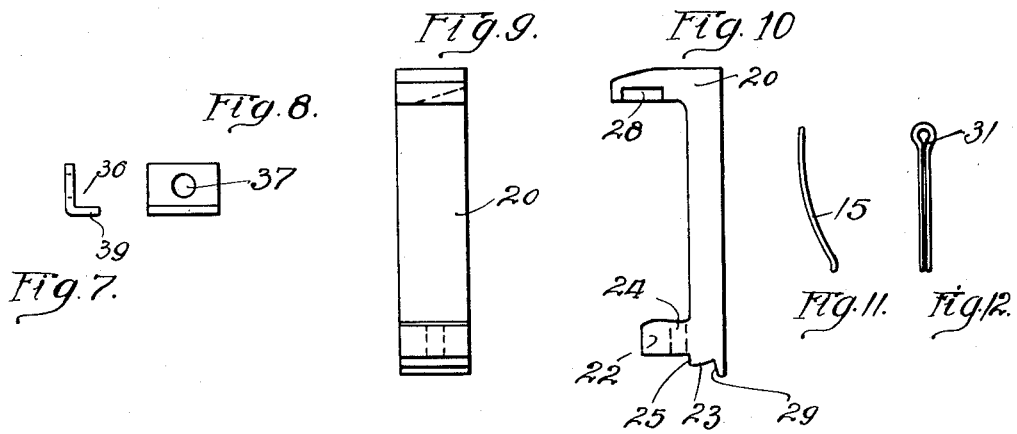
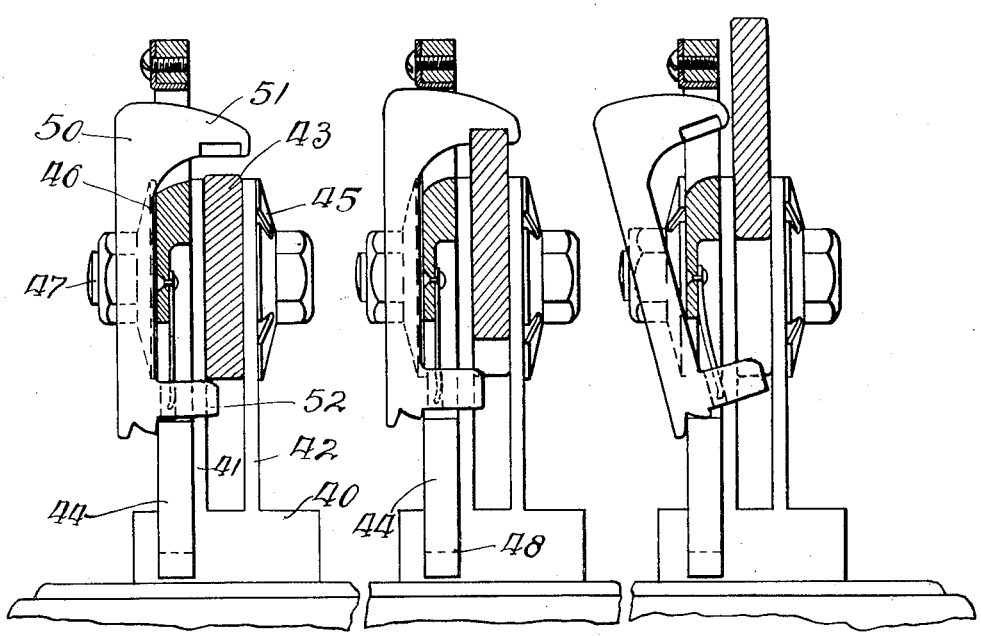

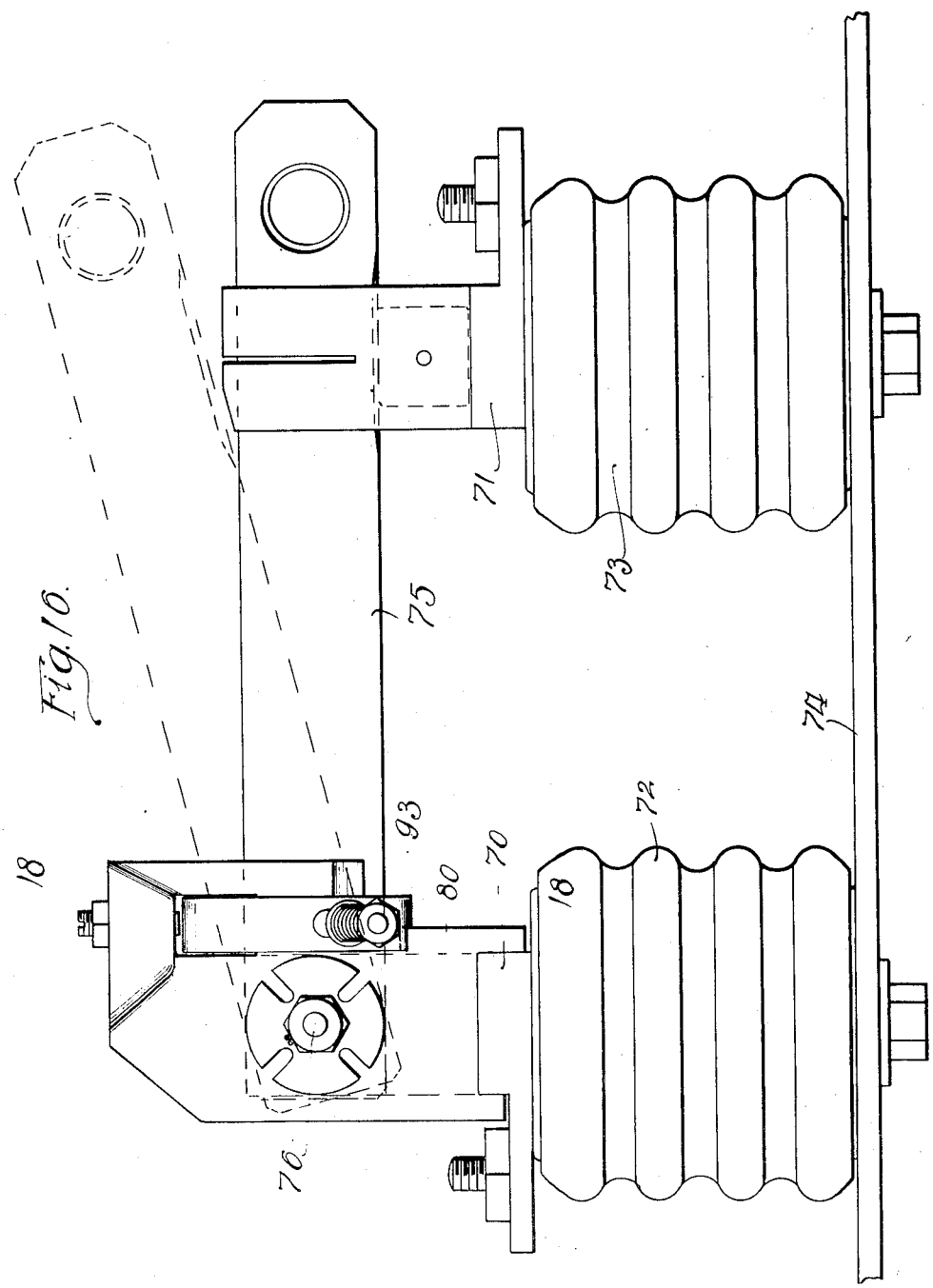

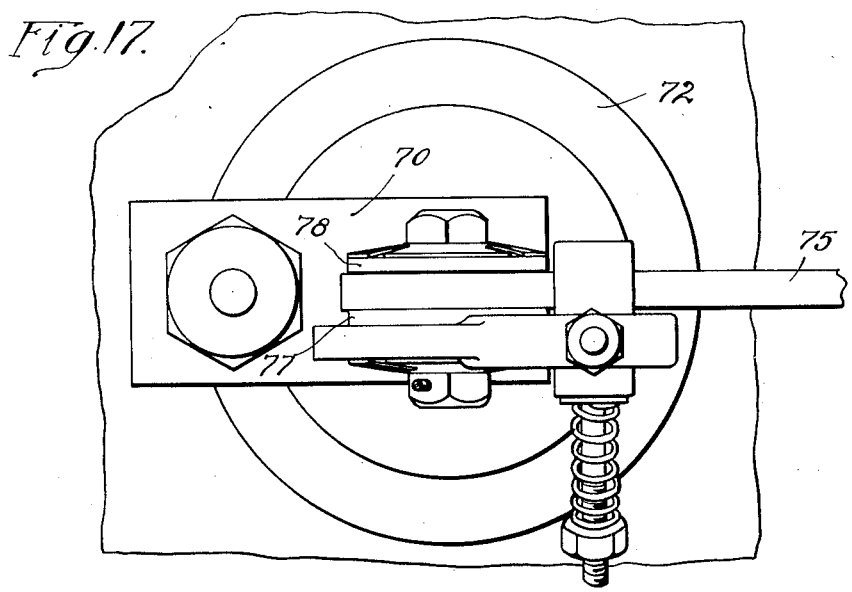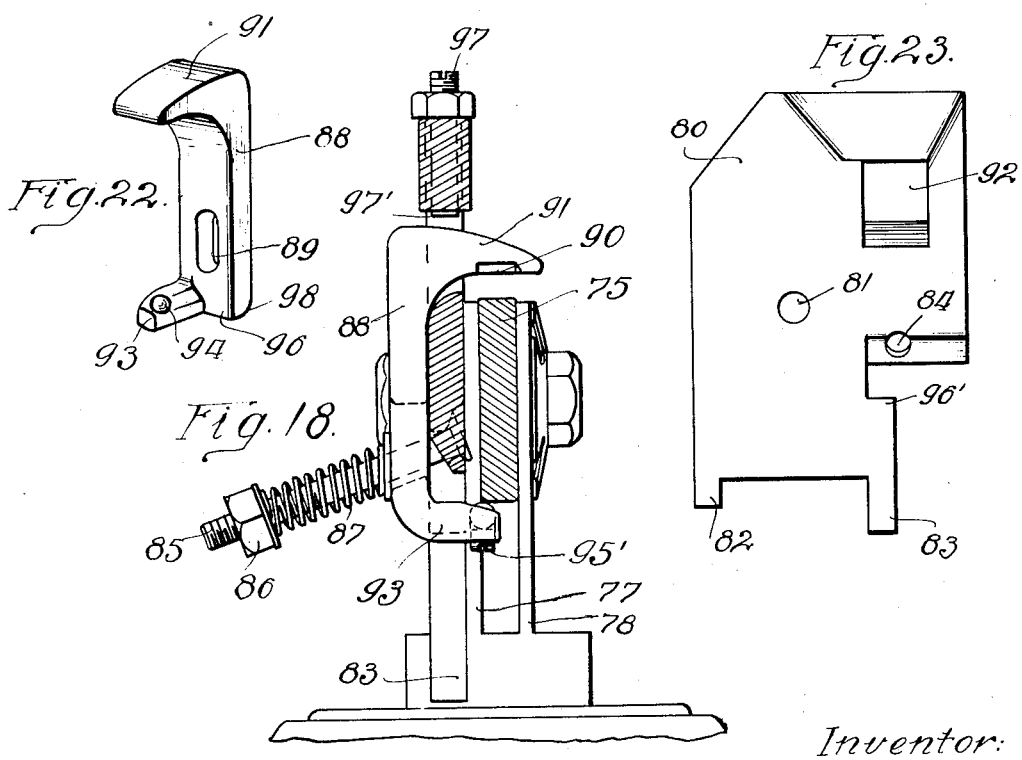

Oct. 31, 1933.  B. STRAI  1,933,285
SWITCH
Filed Sept. 20, 1928   7 Sheets-Sheet 6
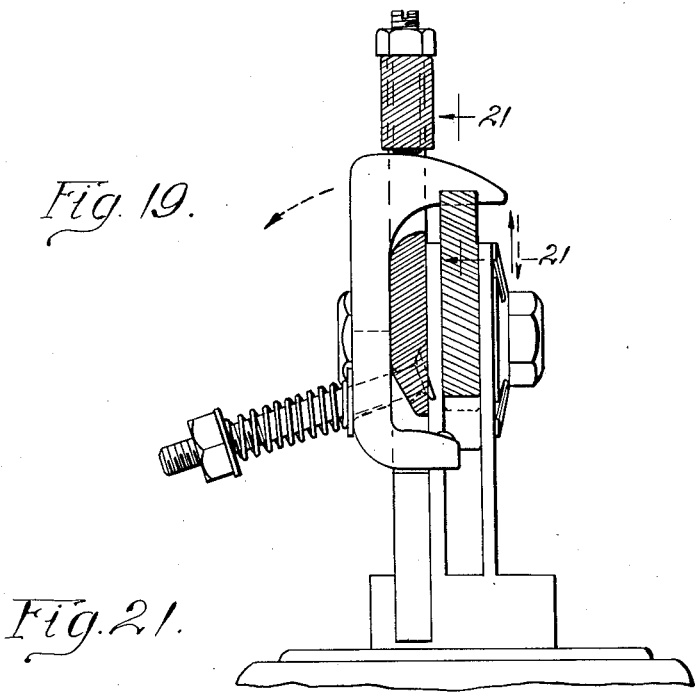
Fig. 19.
Fig. 21.
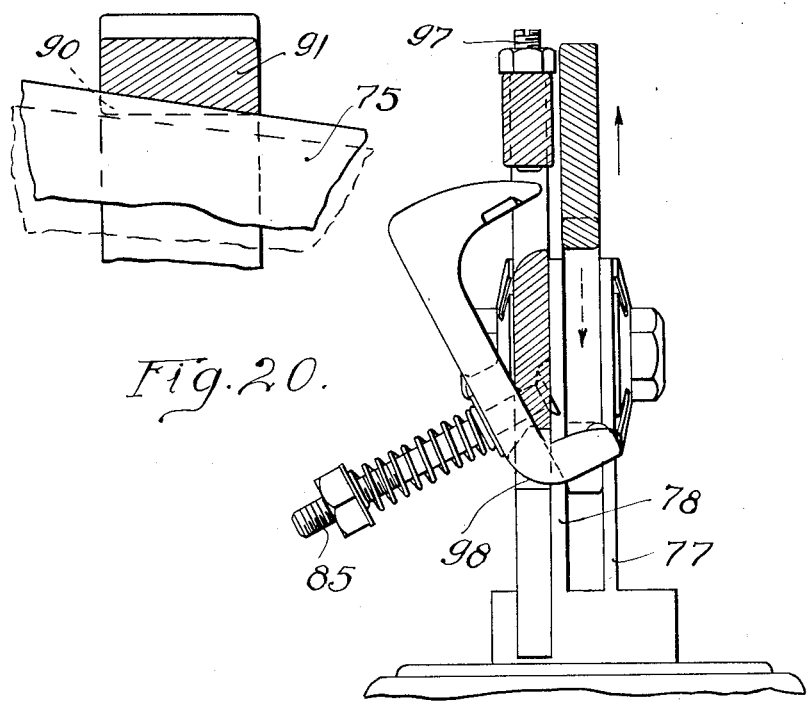
Fig. 20.
Inventor.
Bernhard Strai.
By Brown Jackson Boettcher Dienner
Attys.

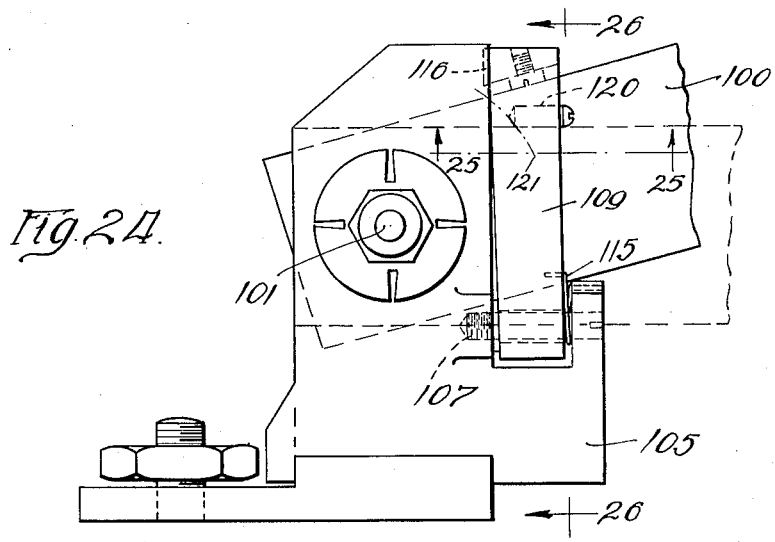
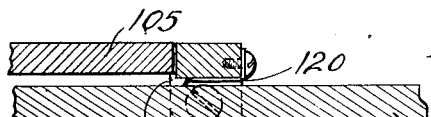
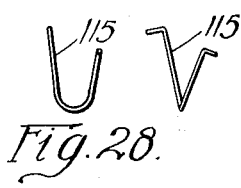
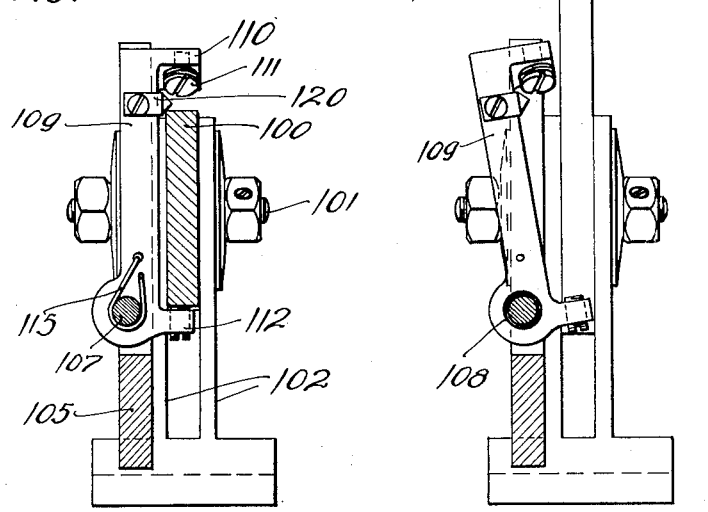

Patented Oct. 31, 1933

1,933,285

UNITED STATES PATENT OFFICE 1,933,285

SWITCH

Bernhard Strai, Elmwood Park, Ill.

Application September 20, 1928
Serial No. 307,265

15 Claims. (Cl. 177—311)

This invention relates to switches in general and more particularly to electric switches known as disconnect switches. Switches of the kind here contemplated are used in series with an oil switch or other circuit breaker and are intended to be operated only after the circuit has been broken at the circuit breaker. Such switches have a large current carrying capacity and a small current interrupting capacity, and if such a switch is opened before the circuit through it has been interrupted at the circuit breaker the switch is likely to be destroyed by the resulting arc, and the operator is liable to be seriously or even fatally injured.

It is an object of this invention to provide a switch with means for preventing its being inadvertently opened when it is connected in an electric circuit. This is accomplished in the embodiments of the invention here shown by providing a lock so arranged as to divide the opening movement into two steps, one of which is a preliminary movement and must be followed by a partial reclosing movement before the full opening of the switch can be accomplished. During the preliminary opening movement the current carrying contacts of the switch are separated a short distance, sufficient to permit the formation of a small arc. If the circuit through the switch has not been opened at another point, a short arc will form upon the preliminary opening of the switch. The attendant observes the presence of the arc and, being thereby informed of the fact that the circuit through the switch is alive, recloses the switch completely and does not reopen it. The circuit through the switch may then be opened at the circuit breaker and the opening operation repeated at the disconnect switch.

The switch is so arranged that to fully open the same it must be only partially reclosed after the preliminary opening. If, after the preliminary opening, the switch is fully reclosed, the lock is brought back to its initial position thereby necessitating a repetition of the preliminary movement prior to the actual opening of the switch.

This is of importance for if the preliminary opening of the switch indicates that it should remain closed it is not desirable to leave the switch in such a condition that it may be subsequently opened without a preliminary movement to determine whether or not the circuit through the switch has been opened at that time.

The principles of the present invention may be readily applied to switches already manufactured and installed as well as at the time of their manufacture. To apply the principles of this invention to switches already manufactured there is provided an attachment plate which may be attached to the switch at the blade pivot thereby eliminating the necessity of drilling holes into the switch or in any way modifying the current or voltage characteristics of the switch. The attachment plate is provided with a lock which is actuated by the preliminary opening of the switch to prevent the full opening, and which is released upon a partial reclosure of the switch to permit the subsequent full opening thereof.

This invention is not limited to electric switches, it being equally applicable to valves or the like, or to any apparatus that should not be operated under a given set of conditions and wherein a partial operation will indicate the presence or absence of the conditions without producing undesirable effects.

The attainment of the above and further objects of this invention will be apparent from the following specification taken in conjunction with the drawings forming a part thereof. Referring now to the drawings.

Fig. 1 is a side view of the switch;

Figures 7 and 8 are detailed views of a wear plate used in connection with this invention;

Figures 9 and 10 are detailed views of the lock clamp;

Figures 11 and 12 are two views of a spring used in connection with this invention;

Figures 13, 14 and 15 are sectional views similar to Figures 3 and 4 of a modified form of my invention showing the switch when closed, and during the preliminary opening and full opening, respectively;

Fig. 16 is a view similar to Fig. 1 of another embodiment of my invention;

Fig. 17 is a fragmentary top view of a portion of the switch;

Fig. 18 is a section taken along the line 18—18 of Fig. 16;

Figures 19 and 20 are views similar to Fig. 18 showing the switch in the partially open position and in the position for full opening, respectively;

Fig. 21 is a fragmentary view taken along the line 21—21 of Fig. 19;

Figures 22 and 23 are views of the locking lug and of the attachment plate of the switch shown in Fig. 16;

Fig. 24 shows another embodiment of my invention;

Fig. 25 is a section taken on the line 25—25 of Fig. 24;

Figures 26 and 27 are sections taken along the line 26—26 of Fig. 24 showing the switch in the closed position and in the open position respectively; and Fig. 28 shows two views of the spring for controlling the switch latch.

Figure 4:
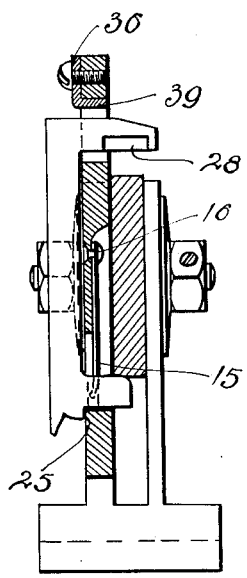
Fig. 4 is a section similar to Fig. 3 showing the switch in the closed position.

Referring now more particularly to the switch shown in Fig. 1, the pronged terminals 1 and 2 are secured to an insulating base, or by means of separate insulators to a base which may be metallic, and are provided with a swingable blade 3 pivoted on the terminal 1 and adapted to be moved into and out of contact with the terminal 2. The terminal member 1 consists of two prong members 4 and 5 between which the blade 3 is pivoted at the pivot pin 6. Spring disc washers 7 and 8 maintain the proper pressure of the members 4 and 5 against the blade 3. Suitable nuts 10 threaded on the pin 6 hold the assembly in place. The terminal 2 consists of two spring prong members between which the end of the blade 3 moves. This is the usual knife switch construction which is well known in the art and of which no further explanation need be given.

Figure 5:
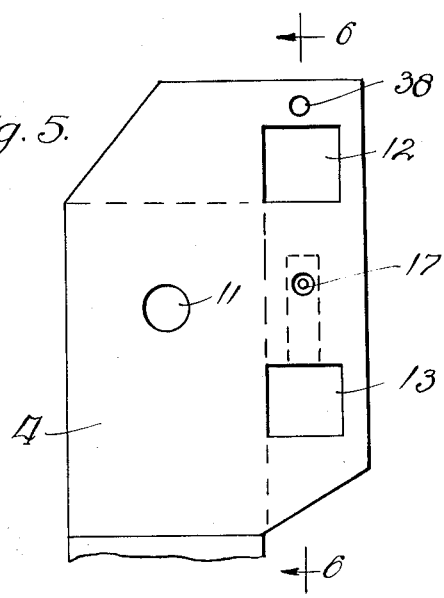
Fig. 5 is a side view of the hinged contact clip.
Figure 6:
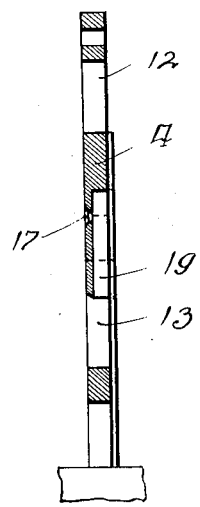
Fig. 6 is a view taken along the line 6—6 of Fig. 5.

The plate 4 constituting one of the prongs of terminal 1 is of the shape shown more particularly in Figures 5 and 6. The plate has a hole 11 therein through which the pivot pin 6 passes and is provided with two holes 12 and 13 for the reception of the locking member 20 shown more particularly in Figures 9 and 10. The piano wire spring 15 (Figures 11 and 12) is secured to the plate 4 by means of a rivet 16 (Fig. 4) passing through the opening 17 in the plate and lies in the slot 19. The end of the spring extends into the opening 13 where it enters a suitable groove in the locking member shown in Fig. 10 in a manner to be more fully explained presently.

Figure 2:
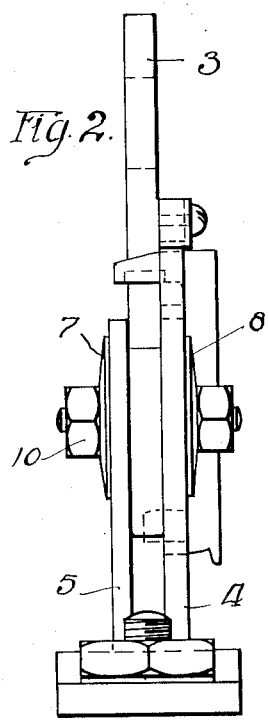
Fig. 2 is an end view thereof.

The locking lug 20 has a forward projecting lip 21 which extends through the opening 12 in the plate 4, and has a projecting lip 22 and a seating portion 23. When the switch is in the closed position the locking lug 20 rests within the plate 4 with the lip 22 extending through the opening 13, as shown in Figures 2 and 4, and with the spring 15 extending into the opening 24 and serving to constantly push the lip 22 further into the opening 13, that is, to the right, as viewed in Figure 4. The shoulder 25 prevents the inward movement of the lip 22 at this time.

When the switch blade 3 is moved from the closed position, shown in dotted lines in Fig. 1, toward the open position it enters into the notch 28 in the locking member 20 and upon upward movement moves the locking member directly upward until the projecting lip 21 engages the upper edge of the opening 12 limiting the further upward movement of the locking member 20. This takes place when the switch is in the position shown in full lines in Fig. 1. At this time the locking member 20 is in the position shown in Fig. 2 with the spring 15 urging the lower lip 22 of the locking member toward the left, as seen in Fig. 2. The locking member cannot, however, move under the action of the spring 15 at this time because the blade 3 is within the groove 28 in the locking member. At this time the switch blade has moved out of contact with the terminal 2 by an amount just enough to render visible whatever arcing may take place. In the switch shown in Fig. 1 the arcing will take place in the space 35 which is about one-eighth of an inch across. If no arcing takes place in the gap 35 the attendant knows that the line is open and the disconnect switch may be safely opened. The attendant then moves the blade from the position shown in full lines in Fig. 1 toward the closed position, a slight amount. The lower edge of the blade is at this time appreciably above the upper surface of the lip 22, and, therefore, as the blade moves downward it does not impart a downward motion to the locking member 20. As the switch blade moves downward it leaves the groove 28 of the locking member 20 and since it does not at this time engage the upper surface of the lip 22, the locking member 20 is free to be moved by the spring 15 to the position shown in Fig. 3. The projecting portion 29 engages the plate 4 and prevents further swinging movement of the locking member. As heretofore stated, the attendant in the return movement of the switch blade does not move it into the full closed position. The switch blade is not moved downward to such an extent as to engage the upper surface of the lip 22, or if it does not engage that surface, the blade is not forced downward sufficiently to bring the locking member back to the position shown in Fig. 4. With the locking member 20 in the position shown in Fig. 3 the switch blade is then again moved to the full open position, it being then free to move past the lip 21 of the locking member.

Figure 3:
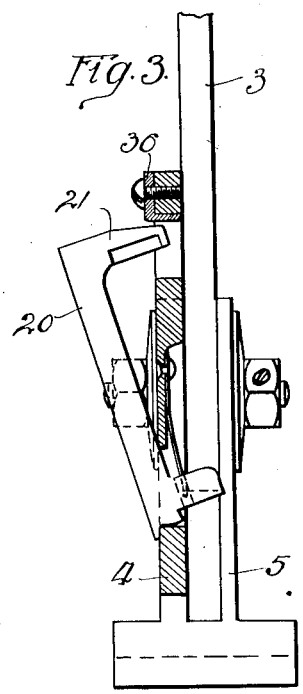
Fig. 3 is a section taken along the line 3—3 of Fig. 1 with the switch in the opened position.

To close the switch, the blade 3 is moved downward in the usual manner and when the lower surface of the switch blade engages the upper surface of the lip 22 it pushes the same downward, rocking the locking member 20 about the curved portion 23 of its surface, and pushing the lug resetting lip 22 outward and to the left from the position shown in Fig. 3. When the lower portion of the locking member 20 has been moved to the left sufficiently to permit the edge 25 to drop along the edge of the plate 4 it is pushed down by the switch blade until the lower surface of the lip 22 is slightly above the lower edge of the opening 13, at which time the switch blade is in the full closed position. It is to be noted that the surface 23 is slightly curved. This is provided in order to facilitate the sidewise movement of the locking member 20 under the action of the switch blade when the blade is moved to the full closed position. It is further to be noted that had the switch blade been moved to the full closed position after it had been opened to the arcing position, the locking member 20 would have been brought back to the position shown in Figures 1 and 2 and it would then be necessary to repeat the preliminary arcing opening before the switch could be fully opened.

The plate 4 being a current carrying member and forming a portion of the terminal member 1, is made of copper. To prevent excessive wear at the upper surface of the opening 20 due to the hammering action of the lip 21 of the locking member when the blade is moved to the arcing position, there is provided a hardened steel angular member 36 shown in detail in Figures 7 and 8. This member 36 is provided with an opening 37 whereby it may be secured to the plate 4 by means of a suitable screw passing through the hole 38 in the plate. The portion 39 of the wearing plate 36 extends through the opening 12 and receives the blow resulting from the upward movement of the locking member 20. As stated above, the member 36 is provided in order to prevent an excessive amount of wear at the upper edge of the opening 12 due to the upward movement of the switch blade. This is of importance since it is the upper edge of that opening switch which limits the upward movement of the locking member 20 and it is to be noted that a slightly excessive movement of the member 20 due to wearing of the upper surface of the opening 12 will result in a very much greater gap being produced at 35. It is desired to have a small gap at 35 to prevent excessive arcing between the blade 3 and the terminal 2. After the plate 36 has become worn it may be replaced by a new plate with very little trouble.

The springs 15 consist of a piano wire bent upon itself to provide an opening 31 for the reception of a screw or rivet to secure it to the plate 4 at 7.

Reference may now be made to Figures 13, 14 and 15 wherein there is shown means for applying the principles of this invention to disconnect switches already in use. These figures show the switch in the closed position, in the arcing position, and while moving to the full open position, respectively. A side view of this switch would be identical to Fig. 1 and these views would correspond to sections taken along the line 3—3 of Fig. 1. In disconnect switches as at present constructed, the terminal member 40 includes two fingers or prongs 41 and 42 between which the blade 43 is pivoted by a pivot rod passing therethrough and through suitable spring washers 45 similar to the washers 8 of Fig. 1. To apply the principles of my invention to such a switch there is provided a plate 44 which is similar in shape to the plate 4 of Fig. 5. This plate is secured to the contact member by providing a pin slightly longer than the pin normally used for pivoting the member 43 between the prong members 41, 42 and passing that pin through the holes in the members 41, 42 and 43 and also through the washers 45 and 46 and through the plate 44. The pivot pin passes through an opening in the plate 44 similar to the opening 11 shown in Fig. 5. The plate 44 is provided with two leg portions 48 which embrace the base of the contact terminal 1 and prevent rotation of the plate 44 about the pivot pin 47. The plate 44 is in all other respects similar to the plate shown in Figures 5 and 6. There is provided a locking member 50 which is similar to the locking members 20 heretofore described, differing therefrom only in that the lips 51 and 52 are larger than the corresponding lips 21 and 22 by an amount equal to the thickness of the aforesaid finger 41. It is believed to be obvious from the description thus far given that the plates 44 and the locking member 50 may be readily attached to a standard disconnect switch and that the manner of operation of the switch will then be such as has been described in connection with the switch shown in Fig. 1.

Figures 16 to 23 show another embodiment of my invention. This embodiment is similar to the one shown in Figures 13, 14 and 15 in that it comprises an attachment for switches already manufactured. It is, however, believed to be obvious that the principles shown in those figures are readily applicable to switches in the process of manufacture and that a switch similar to that shown in Fig. 1 may be made employing the principle of operation of the switch shown in Fig. 16.

The switch shown in Fig. 16 comprises terminal members 70 and 71 secured to insulators 72 and 73, respectively, which insulators are mounted upon the common base 74 and a blade 75 for connecting the terminal members. The blade is pivoted at the pin 76. The terminal 71 is in all respects similar to the terminal 2 shown in Fig. 1. The terminal 70 includes two forks 77 and 78 between which the switch blade 75 is pivoted. Secured to the forks 77 is a plate 80 shown more in detail in Fig. 23. The plate 80 has an opening 81 for the reception of the pivot pin 76 and is provided with legs 82 and 83 which embrace the base of the terminal 70 and thereby prevent rotation of the plate about the pin 76 as an axis. The plate 80 is provided with an opening 84 through which is passed the bolt 85. As may be seen in Figs. 18, 19 and 20, the plate 80 is provided at its inner surface with a seat for seating the head of the bolt 85. The bolt carries an adjustable nut 86 for adjusting the tension on the spring 87. The bolt 85 secures the locking lug 88, shown more particularly in Fig. 22, to the plate 80. The lug 88 is provided with an elongated slot 89 through which the bolt 85 extends. The lip 91 projects through an opening 92 in the plate and the lip 93 extends towards the blade 75, and to one side of the plate 80, in Fig. 16. The lip 93 is provided with a small ball roller 94 held in place by a screw 95. The roller 94 reduces the friction between the blade 75 and the lock lug. The spring 87 normally urges the lower end of the locking member 88 to the right, as seen in Figure 18 and towards the position shown in Figure 20. When the switch is in closed position, the edge 96 of the locking member is below the top of the edge 96' of the plate 80 and hence prevents the rotative movement of the locking member 88. As the switch blade moves upwardly, the upper edge of the blade engages the notch 90 in the lip 91 and thereby moves the entire locking member 88 upward until the upper surface of the lip 91 encounters the lower edge 97' of the screw 97. This occurs when the switch is in the dotted line position shown in Fig. 16, at which time there is a gap of about one-eighth of an inch between the switch blade 75 and the contact terminal 71. Further opening movement of the switch blade is prevented by the locking member 88. The lower edge of the locking member 88 cannot rotate to the right, as seen in Fig. 18, under the action of the spring 87 because the switch blade 75 is within the notch 90. With the switch in the dotted line position, as seen in Fig. 16, the attendant can observe the presence or the absence of an arc in the gap between the switch blade and the stationary switch terminal 71. If there is no arc after a few moments, which indicates that the switch may be opened, the attendant first moves the switch toward the closed position and then to the full open position. During the movement to the closed position the locking member 88 is not moved downwardly and as the upper edge of the switch blade clears the notch 90 in the locking member, the edge 96 being above the edge 96' in the plate 80, the spring 87 swings the locking member 88 to the position shown in Fig. 20. The locking lip 91 being now out of the path of motion of the switch blade 75, the blade may be freely opened.

To close the switch, the blade is moved toward the closed position until the lower edge of the blade encounters the ball 94 whereupon further movement will cause the lower portion of the locking member 88 to swing to the left, as seen in Fig. 20, the swinging taking place about the curved surface 98. After the locking member 88 has swung so that the edge 96 clears the edge 96', further downward movement of the blade causes a downward movement of the locking member which returns the edge 96 to its original position beneath the edge 96' in the plate 80. The switch is now in the closed position shown more fully in Figs. 16 and 18.

The steel screw 97 is provided to take up the wear, that would otherwise take place at the upper edge of the opening 92, brought about by the pounding action of the lip 91 during the preliminary movement of the switch blade.

From the description given in connection with Fig. 1 it is apparent that in the manufacture of switches the prong 77 (Fig. 20) may be omitted in which case the plate 80 would be made integral with the terminal 70 and would constitute one of the current carrying parts of the switch.

It is apparent from the description thus far given that the present invention is applicable to double throw switches either by providing two locking lugs such as 20 or 88, one on each side of the blade pivot pin, or by providing one suitable locking lug having means on each side of the blade pivot pin for locking the switch blade and for resetting the lug.

Referring now to Figures 24 to 28 showing another embodiment of my invention, the switch blade 100 is pivoted at the pivot pin 101 between the two prongs 102 in the usual manner. The plate 105 is secured to the switch in the same manner as the plate 80 of Figure 16 is secured to its switch. A pivot bolt 107 is threaded into the plate 105 and passes through an opening 108 in the locking lug 109.

The locking lug 109 is provided with a forward projecting locking lip 110 for preventing the full opening of the switch blade upon the initial stroke and with a projecting lip 112 for restoring the lug to its operative position upon the reclosure of the switch. A steel screw 111 takes up the wear incidental to the operation of the switch and also provides means for adjusting the extent of the initial opening of the switch. Wear adjustment washers may be inserted between the screw and the lug. The opening 108 in the lug 109 is larger than the pivot bolt 107 to permit a limited sidewise swinging of the lug. The spring 115 forces the upper end of the lug 109 toward the plate 105 and also tends to rotate it in a counter-clockwise direction as seen in Fig. 26. The lug 109 has a locking notch 116 which engages the inner side of the plate 105 and thereby prevents the rotation of the lug to the position shown in Fig. 27. Secured to the lug 109 is a spring 120 the end of which is sharply pointed and bent towards the switch blade, as may be seen from Fig. 25. This spring is provided to bring about the release of the notch 116 from the plate 105 to permit the lug 109 to swing to the position shown in Fig. 27.

Upon the initial opening of the switch, the blade 100 encounters the screw 111 at the time when the switch is in the arcing position. Further opening of the switch blade at this time is prevented by the screw 111.

The sharp point of the spring 120 bites into the blade 100, and as the blade is moved towards the closed position the spring 120 forces the upper end of the lug 109, to the right as seen in Fig. 24. This may be more readily understood when the path of motion of the blade 100 is considered. The portion of the blade engaged by the end of the spring 120 moves in the arc of a circle indicated by the broken line 121, the center of the circle being the bolt 101. This movement has initially a large component in a horizontal direction and to the right, as seen in Fig. 24. The movement of the upper end of the lug 109 to the right releases the notch 116 from behind the lug 105 thereby permitting the spring 115 to swing the lug to the position shown in Fig. 27. This permits the subsequent full opening of the switch.

Upon closing the switch, the lower end of the blade 100 engages the adjusting screw on the lip 112 and swings the lug toward the position shown in Figs. 24 and 26, at the same time imparting to it a slight rocking motion about the bolt 107 to permit the locking notch 116 to clear the edge of the plate 105.

From the above description it may be seen that in each modification of my invention there is provided a controlling device in the form of an escapement which constrains the switch opening movement to forward and reverse motions or steps.

While I have herein shown the invention embodied in an electric switch it is not limited thereto and the term "switch" is used in the accompanying claims in its broadest sense, to include valves, or other mechanical devices for directing a movable body, or current of electricity, etc., over a prescribed course.

In compliance with the requirements of the patent statutes I have herein shown a few preferred embodiments of my invention. It is, however, to be understood that these embodiments are merely illustrative of the invention and that the invention is not limited to the precise construction shown. What I consider new and desire to secure by Letters Patent is:

1. In an apparatus wherein a full operation under a predetermined condition is undesirable and wherein a partial operation indicates the presence or absence of that condition, an operated member, locking means for dividing the operation of the member into two strokes the first of which is limited to an amount necessary to indicate the presence or absence of that condition, means effective after the operated member has been brought to rest at the end of the first stroke for releasing the locking means to permit the full operation of the apparatus, said locking means and the actuated apparatus including cooperating means for resetting said locking means upon a predetermined movement of the apparatus to its initial position to again prevent the full operation in one stroke.

2. In a switch wherein the full opening operation under a predetermined condition is undesirable, retarding means attachable to the switch for dividing the opening operation into two strokes, said retarding means including a member attachable to the switch, locking means carried by the member and engaged by the movable portion of the switch upon the initial stroke to limit the stroke to an amount necessary to determine whether or not said predetermined condition is present, and means for releasing the locking means to permit the full opening operation of the switch.

3. An electric switch comprising stationary and movable contact members, means for preventing injury to the switch by excessive arcing, said means comprising means for limiting the initial opening movement to an amount such as to permit the drawing of a small arc insufficient to injure the switch and sufficient to indicate whether current is carried by the switch, and means for subsequently releasing said limiting means to permit the full opening of the switch.

4. An electric switch comprising two relatively movable members movable into and out of engagement with one another and retarding mechanism dividing the opening movement into two strokes, said retarding mechanisms including means for limiting the first stroke to an amount producing a short gap between the contacts to indicate whether or not a destructive arc will form upon the second stroke operation.

5. In an electric disconnect switch, a retarding mechanism for dividing the opening movement into two strokes, said mechanism comprising means for limiting the opening movement on the first stroke to an amount sufficient to indicate whether or not a destructive arc will form upon the second stroke, and means for releasing said first named means upon the initial return movement of the switch to the closed position to permit the full opening on the second stroke.

6. In an electric switch of large current carrying capacity and low current interrupting capacity, means for securing the switch against inadvertent opening while the same is carrying a large current, said means comprising means for dividing the opening movement into two strokes necessitating a stopping of the opening movement between the strokes, the first stroke being limited to an amount necessary to indicate by the presence of an arc whether or not the current passing through the switch exceeds the safe current interrupting capacity of the switch.

7. In an electric switch of large current carrying capacity and low current interrupting capacity, a pronged terminal member, a blade pivoted between said prongs and held in any given position by the frictional engagement of said prongs with the opposite sides of the blade, locking means carried by one of the terminal prongs and engaging the blade to divide the blade movement into two strokes whereby the switch may be reclosed after the first stroke if the current carried by the switch exceeds the safe current interrupting capacity of the switch, and spring means carried by the last mentioned prong on the blade side thereof for releasing the locking means to permit the full opening of the switch.

8. An electric switch including two terminal prongs, a pivot pin passing through these prongs, a switch blade pivoted on the pin between the prongs, a locking plate secured by said pivot pin to the outer side of one of said prongs, a locking lug carried by said plate and engaging said blade to lock the same against full opening, means carried by the plate for releasing the locking lug to permit subsequent full opening of the switch.

9. In a switch including a blade supporting member, and a blade pivoted to the member by means including a pivot pin passing through the blade and the member, the combination of a locking plate secured to one side of the blade supporting member by said pivot pin, and locking means carried by the plate for limiting the opening movement of the blade to a predetermined fractional portion of the total movement, said locking means and said blade including cooperating means for releasing said locking means upon the initial return movement of the blade to permit the subsequent full opening of the switch.

10. An electric switch including two terminal prongs, a pivot pin passing through the prongs, a switch blade pivoted on the pin between the prongs, a locking plate secured by said pivot pin to the outer side of one of said prongs, a locking lug carried by said plate, and engaging said blade to lock the same against full opening, a bolt carried by the plate and extending through the locking lug, spring means surrounding said bolt and urging the locking lug to the switch released position for permitting subsequent full opening of the switch.

11. In an electric switch, a movable switch blade, a support for the blade, locking means carried by the support for preventing the opening of the switch beyond a predetermined fractional portion of the full opening, spring means urging the locking means to the unlocked position, an abutment preventing the movement to the unlocked position, a second spring effective upon the initial closing movement of the switch after the fractional opening thereof for rendering the abutment ineffective and thereby permitting the first mentioned spring to release the locking means and permit the subsequent full opening of the switch.

12. A switch comprising a supporting base, a pair of insulators mounted thereon, cooperating contact making members supported by the respective insulators and movable into and out of engagement with one another, and abutment means effective as soon as the contacts are slightly separated for blocking the further separation of the contacts, thereby indicating the open or closed condition of the circuit through the switch.

13. A switch comprising a supporting base, a pair of insulators mounted thereon, cooperating contact making members supported by the respective insulators and movable into and out of engagement with one another, abutment means effective as soon as the contacts are slightly separated for blocking the further separation of the contacts, thereby indicating the open or closed condition of the circuit through the switch, and means effective upon the initial reverse switch reclosing movement for releasing the contacts for subsequent full opening movement.

14. A switch including a hinge terminal, a switch blade pivoted on the hinge terminal by means including a pivot bolt passing through the hinge terminal and the blade, a locking member carried by the hinge terminal and including a movable lock piece limiting the switch opening movement of the blade, means for moving said lock piece to its release position responsive to a return motion of the blade from its lock limiting position thereby permitting subsequent complete switch opening movement of the blade, and means responsive to a predetermined further return movement of the blade for resetting the lock piece.

15. A switch, locking means therefor permitting a predetermined fractional opening operation of the switch to an amount sufficient to indicate if current is flowing through the switch, means for releasing the lock responsive to a partial reclosing movement of the switch, and means for resetting the lock to its locking position responsive to a further reclosing movement of the switch.

BERNHARD STRAI.